INVENTORS
ROBERT H. GASCH, JR.
ERNEST F. SCHMIDT
ROGER O. WALES

July 27, 1965 R. H. GASCH, JR., ETAL 3,197,648
OPTICAL MEASURING APPARATUS USING TIME INTERVAL
Filed Sept. 6, 1960 4 Sheets-Sheet 3

INVENTORS
ROBERT H. GASCH, JR.
ERNEST F. SCHMIDT
ROGER O. WALES
BY Joseph E. Ryan
ATTORNEY

United States Patent Office 3,197,648
Patented July 27, 1965

3,197,648
OPTICAL MEASURING APPARATUS USING TIME INTERVAL
Robert H. Gasch, Jr., Long Lake, and Ernest F. Schmidt and Roger O. Wales, Bloomington, Minn., assignors to Honeywell Inc., a corporation of Delaware
Filed Sept. 6, 1960, Ser. No. 54,274
2 Claims. (Cl. 250—236)

This invention relates to measurement systems particularly adaptable to machine tools and more particularly to an optical type measurement apparatus designed to measure accurately small distances and to provide output signals which may be used to accurately position relatively movable parts, such as the parts of a machine tool.

The optical type measuring apparatus of the present invention is designed to be used with other means of measurement to measure larger units of displacement between parts. Thus, for example, in a measurement system, the optical measurement apparatus would measure in a linear type system over a range of displacement of .1 inch to .001 inch while associated measurement equipment would be used to measure relative displacements from .1 inch up through inches and feet of displacement of the relatively movable parts. Therefore we have shown our invention in connection with a larger unit measuring apparatus which may take other forms.

While optical type apparatus has been used in the field of angular and linear measurement and has been applied to machine tools for controlling the positioning of the parts of the same, these previous arrangements have been exceedingly complex in nature and have relied on measurement of variation of light intensity, changes in light patterns, and in counting of light pulses received by the associated sensing cells. All of these prior arrangements involve special associated apparatus to use the signals sensed and to convert them to usable control signals, such as of the analogue type.

The present invention is directed to a simplified optical measurement apparatus in which a chopped light source is split into a pair of sweeping light beams focused on a mask and a grid or optical gratings which are mounted respectively on relatively movable parts, the movement between which it is desired to measure. Each of the optical gratings has a solar cell or photocell associated therewith which are turned on or energized by the sweeping light beams as the photocells are uncovered. The photocells are used to turn on and off an associated measurement device, such as a pulse width modulator, to provide an output signal which is a measure of the lateral displacement of the grating lines from those lines on the mask to measure the relative displacement between the parts over a small range of movement.

Therefore it is an object of this invention to provide an improved optical type measurement apparatus.

It is also an object of this invention to provide apparatus of this type which is simplified in construction, economical to manufacture and maintain, and which will provide an analogue type output.

These and other objects of this invention will become apparent from a reading of the attached description together with the drawings wherein.

Figure 1:
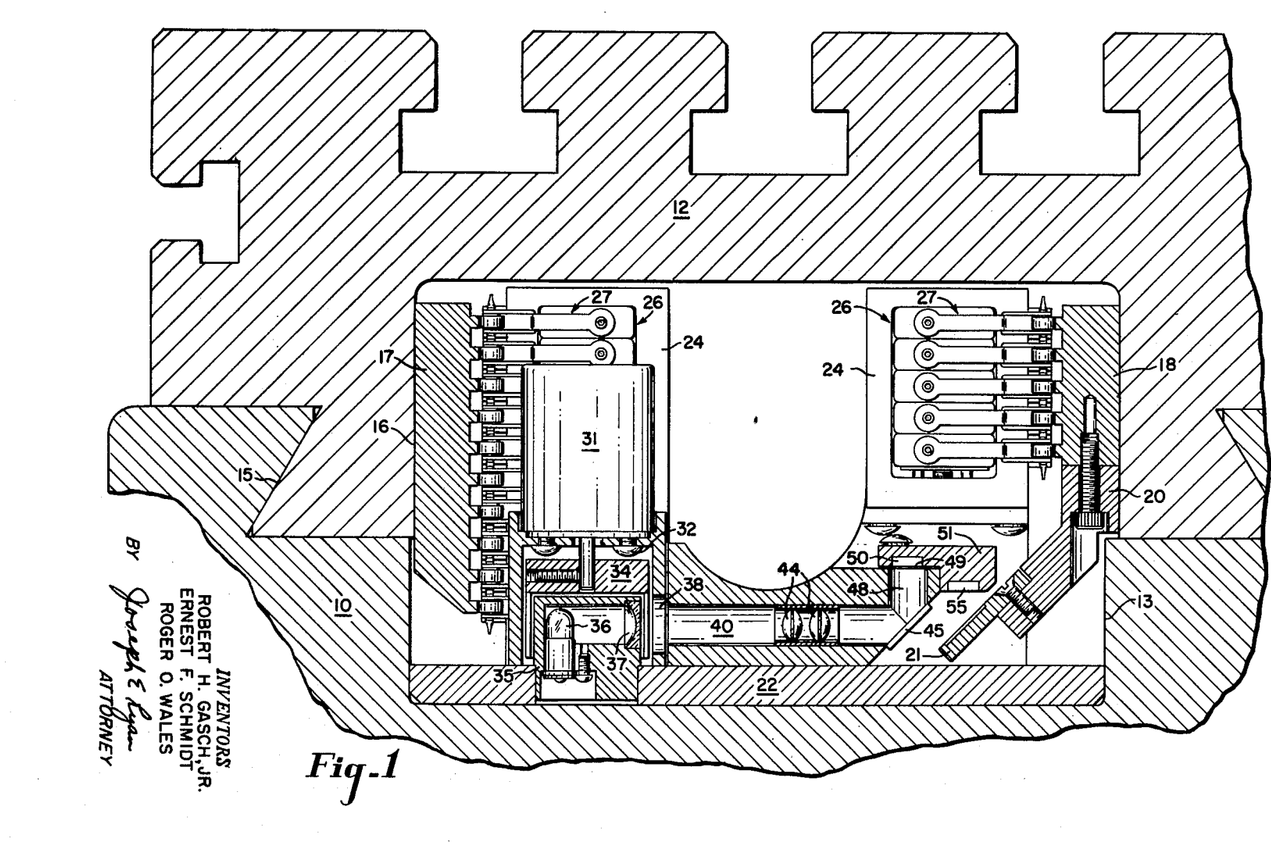
FIGURE 1 is a diagrammatic view of a portion of a machine tool including parts of the optical measuring apparatus and a secondary measuring apparatus.

Our invention is described herein in connection with relatively movable parts of a machine tool for the purpose of measuring relative displacement between said parts. For this purpose, FIGURE 1 shows a broken-away view of a pair of relatively movable parts of a machine tool such as a bed or base 10 and a table 12 which normally move relative to one another. Our improved measuring apparatus is shown located in a recess 13 in the base 10 over which the table 12 moves relative to the base through dovetail type guides 15 in a conventional manner. It will be recognized that in the measurement of displacement of parts in the machine tool to provide signals for control of the same, a separate measuring system will be required between each pair of relatively movable parts of the machine tool. It will further be recognized that this improved measuring apparatus may be utilized in both linear and angular form and may be applied to measure movement between any relatively movable parts, apart from machine tool application.

In FIGURE 1 it will be seen that the table 12 also includes a recess 16 in the table 12 in which are mounted a pair of cam blocks 17, 18 which move with the table. Also attached to the cam block 18 is a bracket 20 carrying a scale or grating 21 which, as will be later noted, is mirrored and has a plurality of light-transmitting lines or openings and a plurality of opaque portions dividing the opening for purposes which will be later noted. In the recess 13 is a mounting base 22, which is secured to the bed or base 10 through suitable means not shown, and mounts through an upstanding bracket 24 a plurality of switches 26 having associated therewith pivoted followers 27 designed to cooperate with the cam surfaces. These switches 26 and cam followers 27 mounted on the upstanding portions 24 of base 22 cooperate with the cam surfaces on blocks 17, 18 to provide a coarse measuring function, as will be later described. Also mounted on the base 22 is a bracket 30 which in turn carries a motor 31 suitably connected thereto through means such as screws 32, the motor driving a cylindrical cup-shaped member 34 having a plurality of openings therein (not shown in FIGURE 1) to provide a chopper mechanism, the purpose of which will be later seen. Positioned within the chopper mechanism in an enclosed housing 35 is a light source 36 having a focusing lens 37 associated therewith and designed to transmit light through the portion of the chopper as it revolves. An opening 38 in the mounting bracket and a passage 40 in the base member 22 provide a path for the light beam which is focused by a pair of lenses 44 on a beam-splitting mirror 45 mounted in the passage. Extending transversely from the passage 40 at the beam splitter 45 is a second passage 48 having a mask 49 covering the same with a photocell 50 located behind the mask and in a mounting bracket 51 attached to the support member 22. A portion of the beam extending beyond the beam-splitting mirror 45 extends to the grating 21 which is set in parallel with the beam-splitting mirror and is designed to reflect light in a direction parallel to the passage 48 and onto a second photosensor or solar cell 55 positioned in the block 51.

Figure 2:
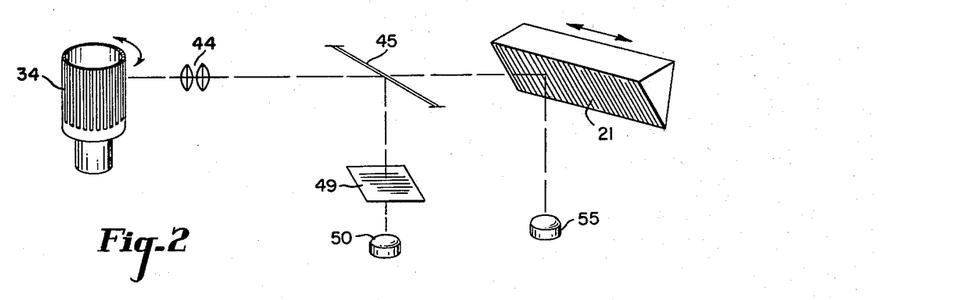
FIGURE 2 is a schematic diagram of the optical portion of the measuring apparatus.

This arrangement and function of parts, particularly as to the optical portion of the measuring apparatus, will be better seen functionwise in the schematic diagram of FIGURE 2 in which it will be seen that the motor driven chopper 34 directs beams of light from the source through a predetermined passage including a lens 44 for focusing the same onto the beam-splitting mirror 45 at which point the light source or sweeping beam is broken into two parts, one being directed upon the grating 21 from which it is reflected onto the photocell 55, while the second beam is directed through a gridwork or mask 49 having light-transmitting openings therein and through the mask to the photocell 50. The chopper is designed to be driven at a constant speed by the motor 31 and the openings in the chopper in the present embodiment are .05 inch and spaced .05 inch apart, these openings being parallel to one another. Thus, as the chopper rotates, a chopped beam will emanate from the light source and tend to sweep through the focusing lens and on to the beam-splitting mirror to provide two beams which sweep at a rate of speed which is fixed or constant. The mask also has uniform or parallel spaced openings which are light-transmitting openings and have opaque bands therebetween. The spacing used on the present mask is .1 inch with the dark or opaque bands measuring .05 inch and the openings measuring .05 inch. The light beam passes through the transparent sections or openings of 0.5 inch of the mask and to the photocell adjacent the same. Similarly, the grating has the same spacing of .1 inch with a dark band or opaque sections of 0.5 inch and light-transmitting or reflecting sections of .05 inch thereon. The grating can be of any type and a grating of photo-etched stainless steel has been found suitable for this purpose since the light may be reflected off of the polished surface and onto the photocell adjacent the same. The actual grating will be physically the length or the distance of relative movement between the parts and the spacing or scale thereon will extend throughout the entire length of the same. The mask, however, is a small section associated with the photocell, since these two parts are stationary to one another and together with the beam-splitting mirror, are mounted on one of the parts. The light-transmitting patterns or graduations on the mask and grating in size and spacing are identical, and in FIGURES 3 and 5 the relationship of these parts with respect to the transmitted light beams will become apparent. While we have shown the openings or light-transmitting sections in the mask, grating, and chopper as having the same dimension, these may vary in size as long as the spacing between the openings in these parts is the same.

Figure 3:
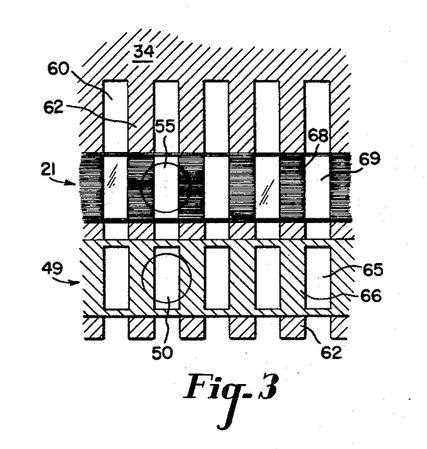
FIGURE 3 is a schematic diagram of the optics of the measuring apparatus.
Figure 4:
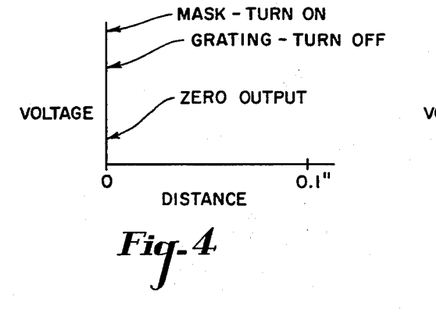
FIGURE 4 is a graph of the output voltage from the solar sensing portion of the measuring apparatus.

In FIGURE 3 these parts are shown in a superimposed sketch to indicate the spatial alignment of the parts and to indicate how light from the light source, as it is cut by the chopper and beam-splitter into a pair of sweeping light beams, will be directed onto the photocells to perform a switching function. Thus in FIGURE 3 the chopper 34 is shown schematically as the gridwork with a plurality of openings 60 and opaque sections 62 therein. The light from the source is directed through the openings or transparent sections and on to the grating and mask, respectively. The mask 49 is shown schematically as having a plurality of openings 65 and opaque connecting sections 66 which overlie the chopper. In a condition of positional alignment of the openings 60 in the chopper and 65 in the mask, light will be transmitted therethrough and on to the photocell 50 indicated schematically on top of the same. The grating is similarly shown with the same type of open and opaque sections, the grating being shown with a plurality of solid 68 and open 69 sections which similarly overlie the chopper openings. In conditions of positional alignment of the openings 69 of the grating with the openings 60 in the chopper or the light-reflecting portion in the grating overlying the openings in the chopper, light will be transmitted onto the photocell 55 associated with the grating. In FIGURE 3 these parts are shown in positional alignment indicating positional alignment or no displacement between the parts upon which the elements of the optical system are mounted, such as the parts of the machine tool. The photosensors each receive light from the chopper as the chopper rotates and the light beams are directed across the openings and onto the photocells behind the same. As will be later noted, the photosensor or solar cell behind the mask, that is, cell 50, is energized by the presence of light on the same to turn on associated measuring equipment. The photosensor or cell 55 associated with the grating will also be energized with the light directed thereon from the chopper as the beams sweep the grating to energize the photosensor, which in turn, will operate, to turn off associated measuring equipment. Thus in FIGURE 4, which is a graph showing the output voltage of associated equipment, it will be seen that for spatial alignment of parts, the mask turns the associated equipment on and the grating turns it off at the same time and a zero output voltage is obained. As previously indicated, the optical resolver is adapted to measure over a small range of movement which has been stated as a range from .099 inch down to .001 inch of relative movement between the parts. The apparatus is shown herein as measuring linear displacement but it will be recognized that angular displacement may be similarly measured.

Figure 5:
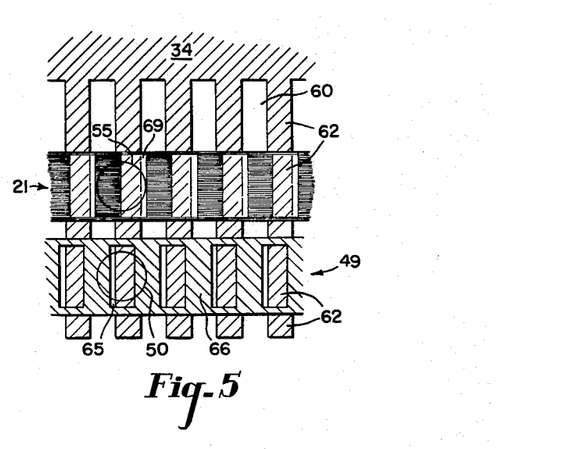
FIGURE 5 is a schematic view of the optical parts shown in FIGURE 3 with the mask and grating displaced from one another.

The schematic diagram of the parts shown in FIGURE 5 is the same type of drawing as that shown in FIGURE 3 except that a condition of disalignment between the parts upon which the mask and grating are mounted is portrayed. Thus the chopper 34 with its openings 60 therein will direct light on the grating and mask simultaneously in sweeping beams. The mask openings 65, it will be noted, are substantially blocked by the opaque or solid portions 62 of the chopper, but a small amount of light can be transmitted to the photocell 50 behind the same. Similarly with respect to the grating, the openings 69 therein are substantially covered by the solid portions 62 of the chopper and a small portion on the edge of the openings 69 are uncovered and transmit light to the photosensor 55 associated with the grating.

Figure 6:
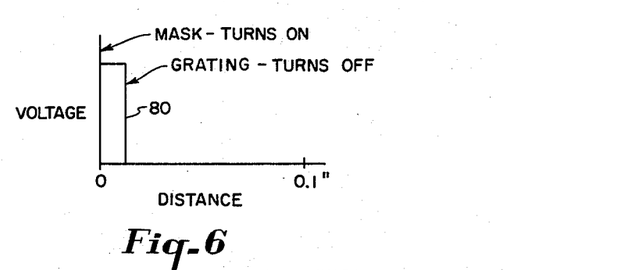
FIGURE 6 is a graph of the output from the photocells under the conditions of displacement shown in FIGURE 5.

The graph shown in FIGURE 6 indicates that the output voltage from the associated equipment which, as will be later defined, is a pulse width modulator controlled by the photocells 50, 55 under the conditions of disalignment provide an output indicated at 80 upon the graph which is proportional to the positional disalignment between the parts over this total range of movement of the parts. Thus the ordinate on the graph indicates positional disalignment between zero and 0.1 inch.

Figure 7:
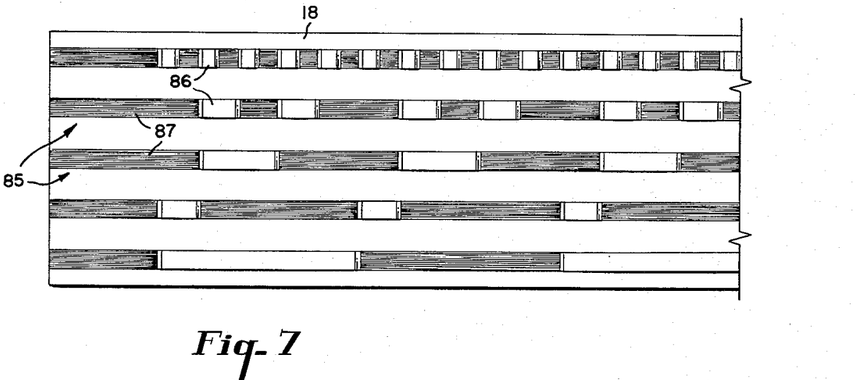
FIGURE 7 is a view of a cam block comprising a portion of the secondary measuring apparatus.

As previously indicated, there is associated with the optical portion of the measuring apparatus a secondary or coarse measurement apparatus in the form of switches and cams to measure displacement over the larger increments of movement. Thus in the present disclosure the switches for a relative movement between parts of up to, for example, 30 inches would be tens, units, and down to tenths of an inch of movement for the coarse measurement. The range in displacement between .1 inch and through .001 inch would be measured by the optical resolver system. Thus in FIGURE 7 a portion of one of the cam blocks is shown to indicate that the cam block, 18 for example, has a plurality of cam surfaces thereon indicated at 85, which surfaces include lands 86 and groove portions 97 designed to indicate in coded or analogue form, whichever type of measuring system may be employed, the units of measurement desired. Associated with each of the cam surfaces 85 is a cam follower having an associated switch 26 therewith as was indicated in FIGURE 1, the switches being operated by movement of the follower and hence the associated switch actuating mechanism (not shown) as the follower is displaced from a land portion 86 to a groove portion 87 of the cam surface. It will be recognized that any type of measuring information or scale may be utilized and this information may be placed in coded form such as decimal, binary, or any of the combinations of the binary code, as well as analogue form, and the particular type of measuring system will dictate the number of cam surfaces 85 to be required. This portion of the apparatus forms no part of the subject invention and is included here as part of the disclosure to indicate one type of complete measuring system which might be employed. For purposes of disclosure it will be assumed that the cam blocks have cam surfaces 85 coded in a decimal form and that a plurality of cams will be employed with associated cam followers and switches to measure relative displacement between the parts over the tens, units and tenths range of displacement. Because the cam followers cannot accurately switch between the land and groove portions 86, 87 of the cam surfaces, it is necessary to employ two sets of cam blocks and two sets of switches to ensure the accuracy of switchover between the positions of operation of the individual switches indicative of a change in the units of displacement. This arrangement is conventional and, as will be later seen, the pairs of switches and cams measuring the same units or the pairs of switches on a single cam block are displaced laterally from one another a distance of one-half the total range of measurement of the optical resolver. By utilizing the resolver output to control a switching device in accordance with which half of the total range of resolver movement the displacement between parts occurs, proper switching of the desired unit switches may be obtained. Thus through control of resolver and a switching control, to be later defined, connection of the unit switches, that is, the tens, units, and tenths, will be made only when the connected switch is either on a dwell portion or a land portion of the camming surface and the switch positioned on the rise or fall between these cam levels will be disconnected from the circuit. Identical cam blocks, switches and converters are utilized to overcome any inaccuracy in the switchover points between the cam surfaces. The circuitry involved in this switchover is disclosed hereinafter.

Figure 8:
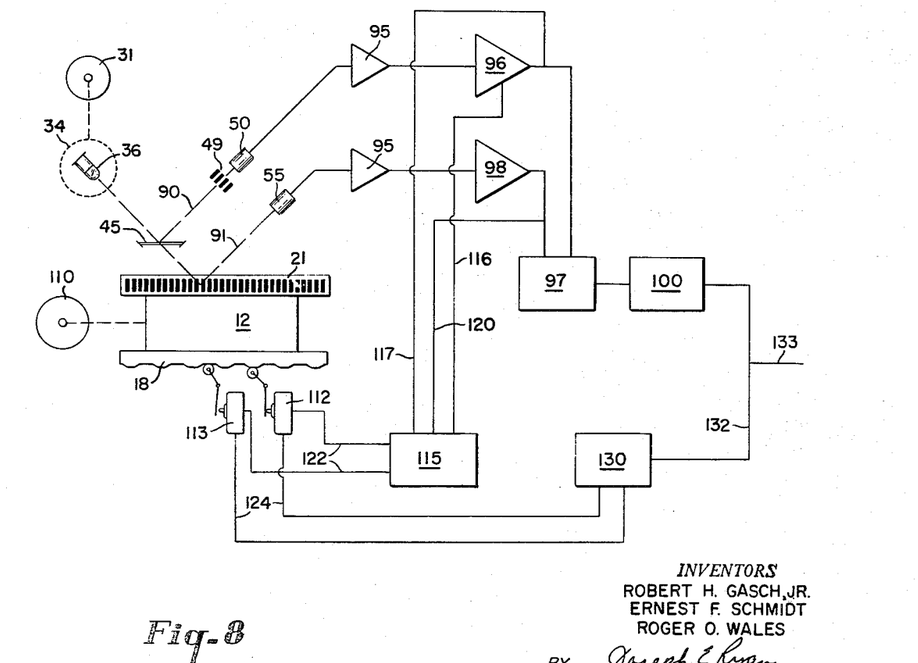
FIGURE 8 is a schematic diagram of the measuring apparatus with associated equipment in block form.

FIGURE 8 of the drawing shows a schematic block diagram of the optical and switching portions of the measurement system with the electrical components connected thereto shown in block form. Thus it will be seen that the motor 31 is mechanically connected to the circular or cylindrical chopper 34 encircling the light source 36 and beams of light will be directed therefrom on to the beam splitter 45. A portion of this light will be directed, as indicated at 90, on the mask 49 which is indicated by a plurality of parallel lines, adjacent the photocell 50. A second portion of the light, indicated by a beam at 91, is reflected off the grating 21, which has a plurality of light reflecting or transmitting and opaque surfaces thereon, to the photocell 55. The respective photocells or solar cells 50, 55 are connected to preamplifier units which are identical in form and are shown in block at 95. The outputs of the preamplifiers are connected to a reference amplifier 96 and phase amplifier 98 to control a pulse width modulator 97 which measures time displacement or phase differential in the operation of the photocells. As will be more fully explained in connection with the schematic wiring diagram in FIGURE 9, the control or pulse width modulator which is operated by the signal outputs of the phase and reference amplifiers 98, 96, respectively, provides a signal output therefrom proportional to displacement between the mask and grating and hence the parts of the machine tool upon which they are mounted. The output of the reference amplifier controlled by the output of the photocell 50 which is energized by the light beam falling on the mask 49, will operate to initiate the energization of the pulse width modulator, while the output of the photocell 55 associated with the grating will control the operation of the phase amplifier 98 to turn off the control or pulse width modulator. The output from the modulator is analogue in form and is proportional to the time elapse between the energization of the photocells 50, 55. Since the speed of the chopper is constant, this time is proportional to, and a measure of, the actual displacement of the parts upon which the grating and mask are mounted so that the output of the pulse width modulator which is connected through a filter 100 is an analogue voltage output indicative of the actual displacement of the parts. Associated with this fine measuring system is the switch operated or coarse measuring system also shown schematically in FIGURE 8. Thus it will be seen that the table portion 12 which is shown schematically as driven by a motor indicated at 110 would be the driven portion of the parts between which the displacement is measured. Mounted on the table are the cam blocks 17 and 18 having a plurality of land and groove surfaces thereon. Associated with the cam blocks are two switches schematically shown which represent the two sets of switches associated with the plurality of cam blocks necessary to measure the ten, units, and tenths of inches of displacement in the example referred to. Thus the two sets of switches, only two of which are shown, are designated herein at 112, 113 and are actually the switches shown generally at 26 in FIGURE 1. Although these switches are shown spaced several cam openings apart, it will be understood that they are spatially separated a distance of approximately one-half the total cycle length of the optical resolver measurement apparatus. It will further be understood that these switches will be so positioned that one will be on one cam surface, that is, lands or dwell, whenever the other is entering the transition between a land and dwell portion. Therefore the switch that is on the fixed, not changing, surface of the cam will be connected, as will be later defined, through a digital switch 115 controlled by the output of the phase and reference amplifiers 96, 98 into the measuring circuit. Thus it will be seen in FIGURE 8 that the digital switch 115 has connected thereto three input leads, two of which come from the reference amplifier through connections indicated at 116, 117, with one of said connections made to the amplifier itself while the other is to the output of the amplifier. This will provide inverted reference signals for control of the digital switch with the output of the phase amplifier which is connected through the connection 120. The output of the digital switch is connected through conductors indicated generally at 122 to the individual banks of switches 112, 113 and from the banks of switches through conductors 124 to the converter indicated in block at 130. The output of the converter is a single summed signal which is connected in common with the output of the resolver through the connection indicated at 132 to provide a single output indicated by the connection 133 providing the analogue signal indicative of total displacement between the parts.

Figure 9:
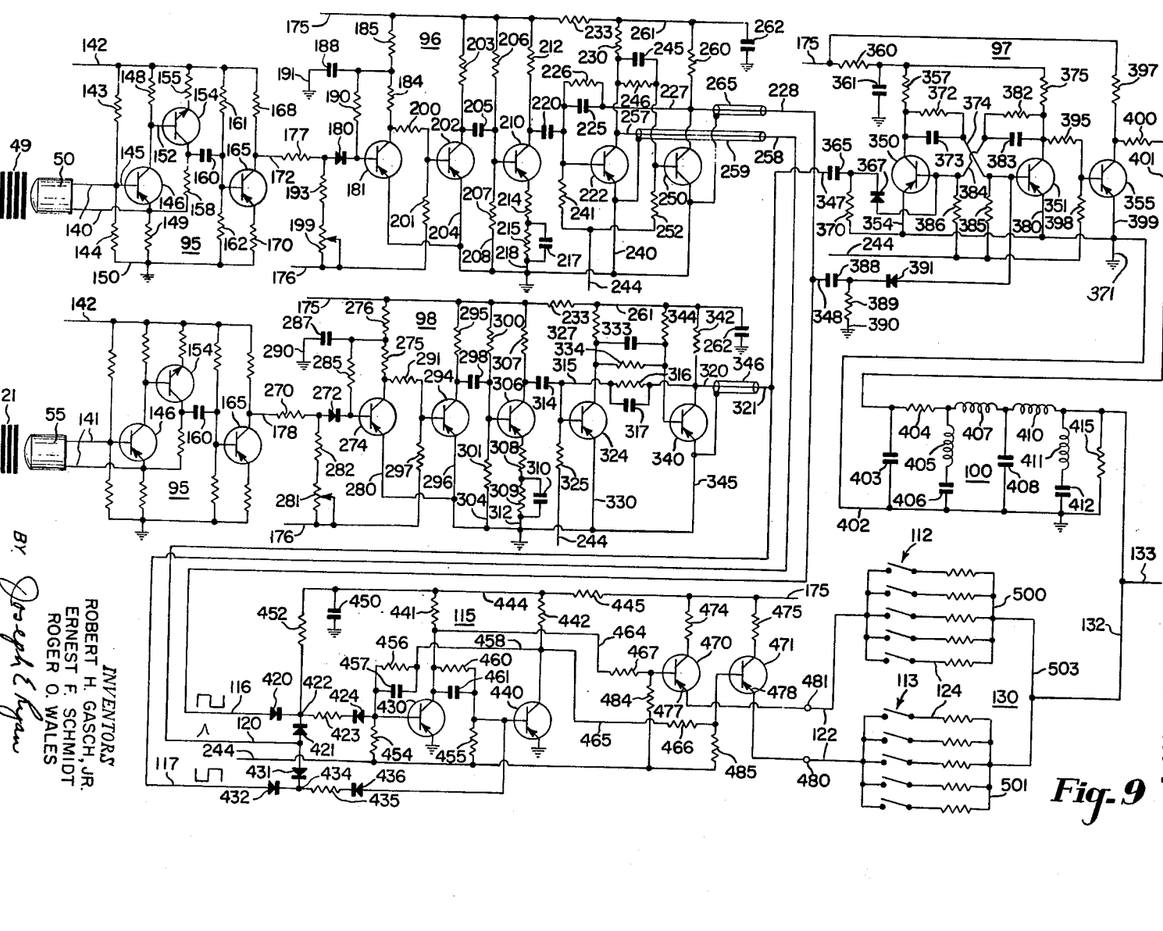
FIGURE 9 is a schematic wiring diagram of the measuring apparatus and associated equipment of FIGURE 8.

The schematic wiring diagram in FIGURE 9 discloses the electrical connections in the blocks shown in FIGURE 8 and the interrelationship or the control provided from the optical resolver output over the digital switch. Thus in FIGURE 9 the photocell 50 associated with mask 49 is connected through the preamplifier 95 to leads indicated at 140 while the photocell 55 associated with the grid 21 is connected to the preamplifier which is identical with that associated with the photocell 50 through leads indicated at 141. Since the preamplifiers are identical, only one will be described, the preamplifiers serving merely to raise the level of output of the respective photocells 50, 55 for control purposes. Preamplifier 95 includes a B— supply 142 with a first potential dividing network including resistors 143, 144 to which the negative lead 140 from photocell 50 is connected. The first stage of amplification includes transistor 146 having a load resistor 148 connected between a B— conductor 142 and the collector of the transistor 146 whose base is connected by conductor 145 to the mid-point of the dividing network formed between resistors 143, 144 and common to the negative lead 140 from the solar cell 50. The emitter is connected to the opposite lead 140 or the plus lead from the solar cell 50 and through a resistor 149 to a ground conductor 150 to which the voltage dividing network 143, 144 is connected. The output of transistor 146 is directly coupled through a conductor 152 to the base of the second transistor 154 whose emitter is connected to a load resistor 155 and the B— conductor 142 and whose collector is connected through a load resistor 158 and to the emitter of transistor 146. Thus the output of transistor 146 controls the bias on the transistor 154 and the output of this transistor is taken from its collector through a coupling condenser 160 connected to a dividing network formed by resistors 161, 162 connected between B— conductor 142 and ground conductor 150. The final amplifying stage of the preamplifier is comprised of the transistor 165 whose base is connected to the mid-point of the resistors 162, 161 and common to the condenser 160. Transistor 165 has its collector connected through a load resistor 168 to the B— conductor 142 and its emitter connected through a resistor 170 common to the ground conductor 150 with the output taken from the collector through a conductor 172. As previously indicated, since the preamplifiers for the mask and grating photocells are identical to that coupled to the photocell 55, it will not be described in detail. The output from these preamplifiers are connected to the phase or reference amplifiers respectively. Thus the conductor 172 indicates the output connection from the preamplifier 95 associated with the photocell 50 and connected to the reference amplifier 96 while the conductor 178 leads to the input stage of the phase amplifier 98 to be later defined.

Considering the reference amplifier 96 it will be noted that it includes a B— supply 175 and a B+ supply 176 with the input conductor 172 connected through a bias resistor 177, and a diode 180 to the base of a first transistor 181. The collector of this transistor is connected through load resistors or bias resistors 184, 185 to the B— supply 175 with a mid-point between the two resistors being connected through a biasing resistor 190 back to the base of the transistor 181 and through a condenser 188 to ground 191 for decoupling purposes. The B+ supply 176 is connected through biasing resistors 192, 193 to the diode 180 to provide a positive bias on the base of the transistor which operates in conjunction with the input signal for biasing purposes. The output of this transistor 181 is connected through a coupling resistor 200 and a load resistor or bias resistor 201 to the B+ supply and the base of the second stage of amplification or transistor 202. Its collector is connected through a load resistor 203 to the B— supply and its emitter is grounded as at 204. The output of this amplifying unit is coupled to the next amplifier through a condenser 205, which is connected to the collector and a mid-point of a voltage dividing network formed by resistors 206, 207 connected at one extremity of the B— supply 175 and to a ground connection 208. The next amplifying stage or transistor 210 has its base connected to the mid-point of the dividing network formed by resistors 206, 207, and to condenser 205 with its collector being connected through a load resistor 212 to the B— conductor 175. Its emitter is connected through bias resistors 214, 215 with a condenser 217 connected in parallel with resistor 215 and to ground 218. The output of the amplifying section or transistor 210 is condenser coupled through a condenser 220 connected to the base of a transistor 222 or the input of a bistable flip-flop circuit formed by transistors 222 and 250. In this flip-flop circuit the base of transistor 222 is connected through a condenser 225, resistor 226 circuit in parallel and through a conductor 227 to the collector or output of transistor 250. The transistor 222 has its collector connected through a load resistor 230 and a dropping resistor 233 to the bias conductor 175 with the emitter of the transistor grounded as at 240. Also connected to the base of the transistor 222 is a biasing resistor 241 connected to a lower voltage B+ supply indicated at 244. The output of the transistor 222 is condenser and resistor coupled by means of condenser 245 and resistor 246 in parallel therewith to the base of a transistor 250 as a feedback to transistor 250, and this base is also connected through a biasing resistor 252 to the lower voltage B+ supply 244. In addition the output from the amplifying stage 222 is directly connected from the collector through a conductor 257 to an output terminal 258 of the reference amplifier providing a reference output signal. In addition a shield 259 shielding the conductor 257 is connected to ground conductor 240. Transistor 250 has its collector connected through a load resistor 260 to the conductor 261 common to the dropping resistor 233 and a grounded decoupling condenser 262 and has its emitter connected to a ground. A ground shield 265 shields the output terminal 228 connected to the collector which has an output signal thereon inverted in phase from that applied to the conductor 257 and terminal 258. The outputs taken from the flip-flop circuit connected to the output terminals 228, 258 of the amplifier are inverted in phase from one another and of the same wave form. As will be later noted, these output circuits are connected to the pulse width modulator and digital switch with the output from the terminal 228 being connected to the pulse width modulator for control of the optical measuring apparatus.

The phase amplifier 98 which receives its input from the conductor 178 of preamplifier 95 connected to the photocell 55 and is similar in construction in its initial stages to the reference amplifier 96, but includes a one shot multivibrator in its output stage in place of a flip-flop circuit. This amplifier includes the B— supply 175, the B+ supply indicated at 176, a smaller voltage B+ supply indicated at 244, the dropping resistor 233 connected to the B— supply and the decoupling condenser 262 connected to ground for the B— supply. The input stage of the phase amplifier includes a bias resistor 270 and a diode 272 connected to the base of a first transistor 274 whose collector is connected through load resistors 275, 276 common to the B— supply 175. The emitter is grounded as at 280 and a positive bias is supplied from the B+ supply 176 through resistors 281, 282 connected to the diode 272 and input resistor 270 common to the base of the transistor 274. The base is also biased through a resistor 285 connected to the common connection of load resistors 275, 276 and to a decoupling condenser 287 connected to ground 290. This amplifying stage is resistor coupled through a resistor 291 to the base of a second transistor 294 whose collector is connected through a load resistor 295 to the B— supply 175 and whose emitter is grounded as at 296. The base of this transistor 294 is also connected through a bias resistor 297 to the B+ supply 176 and its output is taken from the collector through a coupling condenser 298 connected to the common point of two resistors 300, 301 of a voltage dividing network connected between the B— conductor 175 and ground indicated at 304. The next amplifying stage of the phase amplifier 98 includes a transistor 306 whose collector is connected through a load resistor 307 to the B— conductor 175 and whose emitter is connected through bias resistors 308, 309 with a filter condenser 310 connected in parallel with the resistor 309 and to ground as at 312. These stages provide the pulse forming output for the phase amplifier which is condenser coupled through condenser 314 to the input of the multivibrator formed by transistors 324 and 340. This input circuit is connected to the base of a transistor 324 which is connected to the coupling condenser 314 and also through a bias resistor 325 to the B+ supply 244. Transistor 324 has its collector connected through a load resistor 327 to the voltage dropping resistor 233 or lower voltage conductor 261 as in the reference amplifier. The emitter of this transistor is grounded as at 330. The base is also connected in a feedback circuit including a parallel connected resistor 316 and condenser 317 or cross coupling network to the collector of transistor 340. The output from transistor 324 is taken from the collector which is connected through the combination of the coupling condenser 333 and resistor 334 in parallel and connected to the base of transistor 340 whose collector is connected to the conductor 261 through a load resistor 342. The base of transistor 340 is connected through a bias resistor 344 to the B— conductor 261. Transistor 340 is normally biased on and the condenser 333 and resistor 344 provide a time delay circuit in its operation with the resistor 334 serving as a discharge path for condenser 333. The emitter of this transistor 340 is grounded as at 345 and the output is taken from the collector through conductor 320 to terminal 321 with a shield circuit 346 shielding the conductor 320 in a conventional manner. The details of the reference and phase amplifiers together with the preamplifier are conventional and as previously noted the preamplifiers merely provide an increased level of output from the solar cells 50, 55 to control the energization of the reference and phase amplifiers 96, 98 respectively. The reference amplifier provides square wave outputs which are identical but inverted because of the connections to the different amplifying stages and the output conductors are shielded in a conventional manner. The phase amplifier provides a peaked output which as will be later noted will vary in time or phase from the output of the reference the amplifier depending upon the relative displacement between the parts. The outputs of the reference and phase amplifiers are connected to the pulse width modulator indicated in block at 97 in FIGURE 8.

The outputs of the reference amplifier and phase amplifier as previously indicated are used to turn on and off the control which provides a voltage output which is a measure of the actual displacement between the parts or elements of the machine tool or the parts or elements between which measurement is desired. Thus the pulse width modulator shown at 97 in block in FIGURE 8 is basically a flip-flop circuit with an amplifier which utilizes a B— supply 175 and the B+ supply 244 and which receives its inputs from the terminal 228 of the reference amplifier and the terminal 321 of the phase amplifier as previously described. Thus the conductors 347, 348 are connected respectively and the shielded terminals 321, 228 to the inputs of the modulator. The flip-flop portion of the modulator is comprised of two transistors 350, 351 and a final output amplifier defined by the transistor 355 which is normally biased in the off direction. The amplifier or transistor 350 of the flip-flop combination is normally on having its emitter connected to ground as at 354, its collector connected through a load resistor 357 and a voltage dropping resistor 360 to the B— supply conductor 175 with the grounded decoupling condenser 361 connected to the resistor 360 in a conventional manner. The base of transistor 350 has connected thereto the input signal from the phase amplifier 96 through a coupling condenser 365 and diode 367 in series with a bias resistor 370 connected to the condenser and ground as at 371. The collector of the transistor 350 is coupled through a resistor 372 and condenser 373 in parallel to the base of the transistor 351 through a conductor 374 in a conventional flip-flop type circuitry. The transistor 351 has its collector connected to a load resistor 375 through the dropping resistor 360 to the B— supply and its emitter grounded as at 380. Similarly the output circuit of the transistor 351 is connected through a coupling resistor 382 and condenser 383 in parallel therewith by means of a conductor 384 to the base of the transistor 350. In addition a bias circuit for each of the transistors 251, 350 is provided from the B+ supply through load resistors 385, 386 respectively. In addition the transistor 351 includes the input circuit from the conductor 348 connected to the output terminal 228 of the reference amplifier through a coupling condenser 388, a bias resistor 389 to the ground connection 390 and through a diode 391 to the base of the transistor. As previously indicated, the transistor 350 is normally off, being turned on by the output of the phase amplifier. Thus it will be seen that the transistor 351 of the flip-flop circuitry will be turned on and off at the rate of 60 cycles per second or the speed of rotation of the chopper since the mask and associated photocell 50 will receive light pulses at this rate. This transistor is normally off and will be energized by the input from the reference amplifier at this rate, with the output operating to reset or set the input for the transistor 350 in a conventional manner. If however the phase amplifier provides an input at the same time that the reference amplifier does, indicating no positional disagreement between the reference and phase amplifiers, the transistor 350 will attempt to turn on with the input signal from the phase amplifier and energize its feedback circuit to the base of transistor 351 to prevent the same from operating. In the event that positional disagreement does exist between the parts, indicating a phase displacement between the outputs of the phase and reference amplifiers, a time lag will occur between these outputs such that transistor 351 will be turned on by its input signal setting up the bias or feedback circuit to the transistor 350 which will turn on when the output signal from the phase amplifier is received to turn off the transistor 351. An output is provided from the transistor 351 through a coupling resistor 395 to the base of the transistor 355 whose collector is connected through a load resistor 397 to the B— supply 175 and whose emitter is connected to ground as indicated at 399. The base of the transistor 355 also receives a bias supply through a resistor 398 connected to the B+ conductor 244 and the output is taken from this final stage in amplified form through a load resistor or coupling resistor 400 connected to the terminal 401. Thus when positional disagreement does occur, the output from the transistor 351 will operate to trigger the firing of the normally off transistor 355 causing the same to fire and provide a pulsed output the width of which is indicative of the positional disagreement between the timed outputs between the phase and reference amplifiers or the positional disagreement between the parts associated therewith.

The output of the pulse width modulator 97 is connected to the filter indicated generally at 100 which is conventional in form and operation. The input lead to the filter corresponds to the conductor or terminal 401 of the modulator 97 while the opposite conductor 402 is grounded. This filter circuit includes a first condenser 403 connected across the input and ground with a first filtering combination including a resistor 404 and an inductance 405 and condenser 406 in series therewith connected between the resistor in the input circuit and the ground conductor 402. The second filtering stage includes an inductance 407 and a condenser 408 and the final filtering stage includes an inductance 410, an inductance 411 and a condenser 412 connected in a conventional manner. The output of the filter is taken across a load resistor 415 connected between the output from the inductance 410 and ground conductor 402. This output as noted in the schematic diagram is connected in circuit with the output from the switches or the coarser measuring portion of the apparatus to provide the total measurement output.

As indicated above the outputs of the phase and reference amplifiers 98, 96 respectively also control a digital switch which selects one or the other of the banks of switches 112, 113 to be used in the measurement of the coarser or larger units of displacement. Depending upon which half the differential output between the reference and phase amplifier exists, that is which half of the output of the pulse width modulator or which half of the range of movement is being measured by the optical measuring apparatus, the digital switch will respond to select one or the other of the banks of switches 112, 113 to be connected to the converting apparatus 130. Thus it will be seen that output conductors 116, 117 and 120 from the reference and phase amplifiers 96, 98 are connected to the inputs of the digital switch 115. The terminal 228 in the reference amplifier 96 represents the first reference signal which is connected to the conductor 116 while the terminal 258 represents the second reference output or inverted output connected through the conductor 117 to the digital switch. Similarly the conductor 120 is connected to the output terminal 321 of the phase amplifier 98 which terminal is also connected to the pulse width modulator as previously described. It will be seen that the digital switch connects the input from conductor 116 and the phase amplifier conductor 120 in a conventional type and circuit formed by diodes 420, 421 to a common point 422 which in turn is connected through a biasing resistor 423 and diode 424 to the base of a transistor indicated at 430. The signal from the reference amplifier connected to conductor 117 is also connected in an and type circuit with the signal on the conductor 120 from the phase amplifier 98 through diodes 431, 432 connected in common at a point 434 and through a bias resistor 435, diode 436 to the base of a second transistor 440. The respective collectors of the transistors 430 and 440 are connected through load resistors 441, 442 respectively to a conductor 444 and through a voltage dropping resistor 445 to the B— supply 175. In addition the conductor 444 is decoupled through a grounded condenser indicated at 440 which in turn is connected through a bias resister 452 to the common point 422 and the input leading to the base of the transistor 430. In addition the transistors 430, 440 also include bias circuits from the B+ supply 244 through resistors 454, 455 respectively which are connected between the conductor 244 and the respective bases of the transistors. In addition a feedback bias circuit is included for transistor 430 from its base to a resistor 456 and condenser 457 connected in a parallel circuit and through a conductor 458 to the collector of transistor 440. The output of the transistor 430 is coupled through a resistor 460 and condenser 461 combination in parallel to the base of the transistor 440 and output circuits are taken from the collector circuits of the two transistors 430, 440 respectively through conductors 464, 465 and resistors 467, 466 to the bases of a pair of output transistors 470, 471 in a switching type circuit. The transistors 470, 471 include or have connected to their collectors load resistors 474, 475 which are connected in common to the B— conductor 175 and also have their emitter circuits 477, 478 connected to the output terminals 480, 481 of the switch. The input circuits to the bases of the transistors 470, 471 in addition to the bias resistors 466, 467 include bias resistors 484, 485 respectively which are connected to the B+ conductor 244.

In the digital switch, the input signals from the reference amplifiers are square wave as indicated in the circuit diagram while the input from the phase amplifier is a pulsed input. Depending upon whether the pulsed input occurs in phase and in the same polarity as the input signals from the reference amplifier in the respective and input circuits, one or the other of the transistors 434, 440 which are normally on will operate or deenergize to turn on one or the other of the final switching type transistors 470, 471, which are normally off, in the output circuit to provide a circuit to the terminals 480 or 481. Thus if the peaked pulse from the phase amplifier on conductor 120 occurs in the first half and in the same direction as the input signal on the conductor 116 from the reference amplifier, the transistor 430 will cease conducting changing the bias on transistor 470 and causing it to turn on and provide a circuit from the conductor or terminal 481 to the converter. Should the peaked output from the phase amplifier 98 occur in the second half of the output wave form in the reference signal on the conductor 117 to correspond therewith this and circuit will be energized and the transistor 440 will cease to conduct, causing the transistor 471 to operate by a change of its bias and providing an output circuit through the terminal 480.

The digital switch as previously indicated merely selects which of the banks of switches 112, 113 are to be connected to the converter 130 which converts switch position in terms of cam operation into analogue type signal outputs which are summed and connected with the output of the optical resolver to provide a final output measurement signal. Thus the digital switch will determine from the time position of its input phase and reference signals, the actual positions of the switch as in banks 112, 113 with respect to the cams, such that switchover will be accomplished whenever the respective cam followers engage the transition portion of the cam between rise and dwell or land and groove portions of the camming surface. As indicated above this was basically to prevent the inaccuracy of switchover on the rise surface to ensure accuracy in the apparatus. Since the switch portion of the measurement system, however, is for the most part conventional it is described only briefly herein to show its use with the optical resolver or measuring system. Thus depending upon the output of the digital switch 115 one or the other of the output terminals will be energized to provide a circuit to one or the other of the banks of switches 112, 113 shown in the converter section to which are connected a plurality of weighted resistors depending upon the type of code or units the cam surfaces are defined in such that these resistors will be connected to a reference supply and provide a proportional voltage output in accordance with cam and follower or switch position. As indicated in the converter circuit the resistor elements are connected in common at conductors 500, 501, that is the individual resistor circuits to provide a common output from each converter bank and the two converter banks are connected again in common at a conductor 503 to provide an output from one or the other of the converter banks which in turn is connected in common through the conductor 132 to the output of the filter providing the single output from the measurement system indicated at 133. As previously indicated this portion of the apparatus may provide for any type of coded information on the cams and suitable conversion apparatus may be applied in the event that the cam surfaces define the measurement in binary coded form to produce an analogue output at the terminals, which will be added to the analogue type resolver output for the total measurement signal.

In our improved measuring system, it will be noted that the optical resolver or measuring apparatus utilizes a mask and grating which are positioned on relatively movable parts between which the measurement of movement is desired. Such a signal is applicable to the control of machine tools as well as for normal indication purposes. The outputs from the respective cells or photosensors 50, 55 indicating the presence or absence of light from a motor driven chopper will determine the positional disagreement between the mask and grid or the light transmitting lines thereon over a relatively small range of movement to control a modulator and provide an analogue type output proportional to this displacement. One of the photocells provides a reference signal which initiates operation of the modulator this being from the reference amplifier associated with the mask which is stationary with the measuring apparatus while the second photocell through its amplifier and controlled by the position of the grid or grating shuts off or stops the operation of the modulator or sensing device to determine the magnitude of analogue output obtained therefrom. In addition the measuring system has disclosed therewith a switch cam type coarse measurement apparatus with the cams being coded in any type of desired measurement information. The switches associated therewith operate into converters which convert to analogue type output which is added to the output of the modulator to provide the signal output in proportion to total displacement between the parts or elements to which the measuring apparatus is applied. It will be evident that this portion of the measuring apparatus may take other forms and be compatible with the optical measurement apparatus of the present invention. Signals from the reference and phase amplifiers of the optical measuring apparatus are utilized to determine which of a pair of switches or banks of switches are to be connected to the respective converting apparatus to ensure switchover on the cams without the inaccuracies involved by operation of the switches on the changeover portions between the respective camming surfaces. Thus in the present disclosure the signals from the reference and phase amplifiers are utilized to control a digital switch which selects one or the other of the banks of cam operated switches to operate into the converter unit and convert switch position to analogue voltage output to be added to the resolver output and provide a true and accurate measurement of the relative displacement between the parts.

In considering this invention it should be remembered that the present disclosure is intended to be illustrative only and we wish to be limited only by the appended claims.

We claim:

1. A linear measuring system for measuring the relative movement between a pair of relatively movable elements, comprising in combination; a fine measuring apparatus including a light source mounted on one of said elements, means providing a pair of equally spaced beams of light from said source, a pair of optical grids each mounted respectively on said pair of relatively movable elements, said light beams being directed on said grids, a photocell associated with each of said grids and operative to be energized upon light from said source falling on said photocell to detect the passage of said beams across each of said grids, means connected to said photocells for measuring the time interval between the periods when each of said photocells become energized to give an output indicative of the displacement of said elements over a fine range of movement; a coarse measuring apparatus for measuring over a coarse range of displacement between said elements including two sets of a plurality of switching means each calibrated corresponding to the units of coarse distance it is desired to measure, said sets being mounted in part on each of said elements and spatially offset from one another so that one set will read a positive unit of measure whenever the other is in a switchover stage of operation, additional switching means responding to the operation of said photocells of said fine measuring apparatus for connecting said one of said sets of switching means to an output circuit for said coarse measuring apparatus; and circuit means combining the outputs of said fine and coarse measuring apparatus to give an indication of relative displacement of said elements over said coarse and fine ranges of movement.

2. A linear measuring system for measuring the relative movement between a pair of relatively movable elements, comprising in combination; a fine measuring apparatus including a light source mounted on one of said elements, means providing a pair of equally spaced beams of light from said source, a pair of optical grids having similarly spaced light transmitting portions thereon each mounted respectively on said pair of relatively movable elements, said light beams being directed on said grids, a photocell associated with each of said grids and operative to be energized upon light from said source falling on said photocell to detect the passage of said beams across each of said grids, means connected to said photocells for measuring the time interval between the periods when each of said photocells become energized to give an output indicative of the displacement of said elements over a fine range of movement; a coarse measuring apparatus for measuring over a coarse range of displacement between said elements including two sets of a plurality of switching means each calibrated corresponding to the units of coarse distance it is desired to measure, said sets being mounted in part on each of said elements and spatially offset from one another so that one set will read a positive unit of measure whenever the other is in a switchover stage of operation; and means including switch control means responding to the operation of said photocells of said fine measuring apparatus for connecting said one of said sets of switching means to an output circuit for said coarse measuring apparatus.

References Cited by the Examiner

UNITED STATES PATENTS

| | | | |
|---|---|---|---|
| 2,415,168 | 2/47 | Gieseke | 250—209 X |
| 2,848,921 | 8/58 | Koulikovitch | 250—232 X |
| 2,857,802 | 10/58 | Cail | 250—237 |
| 2,916,826 | 12/59 | Bower et al. | 250—233 |
| 2,948,890 | 8/60 | Barth et al. | 88—14 |
| 3,153,111 | 10/64 | Barber et al | 88—14 |

FOREIGN PATENTS

| | | |
|---|---|---|
| 822,663 | 10/59 | Great Britain. |
| 829,024 | 2/60 | Great Britain. |

RALPH G. NILSON, *Primary Examiner.*

RICHARD M. WOOD, WALTER STOLWEIN, FREDERICK M. STRADER, *Examiners.*